Oct. 8, 1935.     N. K. ENGST     2,016,420
GAUGE
Filed Nov. 2, 1933
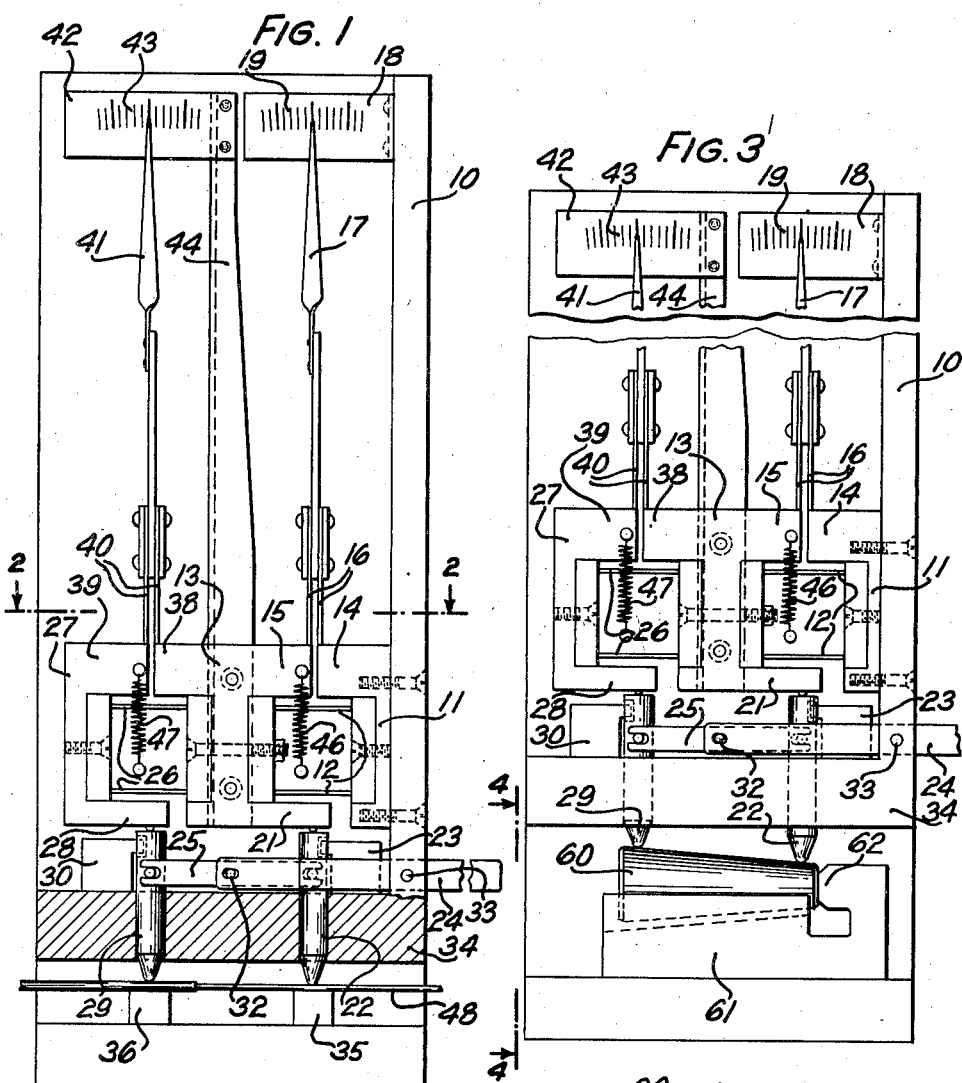
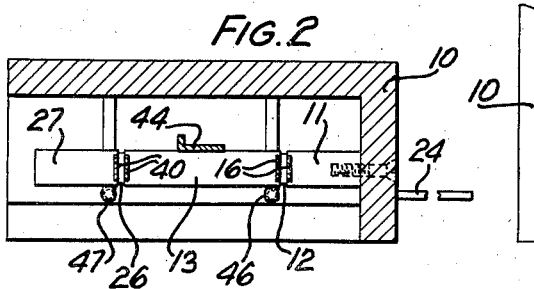
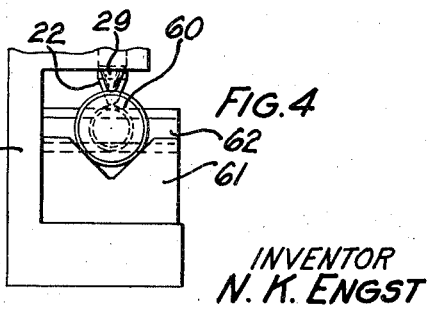
INVENTOR
*N. K. ENGST*
BY *H. A. Whitehorn*
ATTORNEY Patented Oct. 8, 1935

2,016,420

UNITED STATES PATENT OFFICE 2,016,420

GAUGE

Norbert K. Engst, La Grange, Ill., assignor to Western Electric Company, Incorporated, New York, N. Y., a corporation of New York Application November 2, 1933, Serial No. 696,354

10 Claims. (Cl. 33—174)

This invention relates to gauges and more particularly to gauges for measuring dimensions of articles.

An object of the invention is to provide a gauge for simultaneously indicating more than one characteristic of a single article.

In accordance with the object, one form of the invention comprises spaced work engaging plungers and means responsive to the actuation of the plungers for simultaneously indicating more than one characteristic of a single article. In one embodiment of the invention, an indicating unit movable in response to one of the work engaging plungers is mounted upon a member of another gauging unit which is movable in response to the other work engaging plunger so that one of the units indicates the diameter or thickness of an article and the other unit indicates the taper of the article or the thickness of a covering thereon.

Other objects and advantages will be apparent from the following detailed description taken in conjunction with the accompanying drawing, wherein Fig. 1 is a front elevational view of one form of the invention, portions thereof being shown in section;

Fig. 2 is a sectional view taken along the line 2—2 of Fig. 1;

Fig. 3 is a fragmentary front elevational view of another form of the invention, portions thereof being shown in section; and Fig. 4 is a fragmentary end elevational view taken along the line 4—4 of Fig. 3.

Referring now to Figs. 1 and 2 of the drawing, there is shown a stationary frame 10 having a supporting member 11 fixed thereto at the lower end thereof. The supporting member 11 carries parallel reeds 12, the outer ends of which are fixed to a movable element 13. The upper ends of the supporting member 11 and the movable element 13 have portions 14 and 15, respectively, which extend toward each other and have secured thereto vertically extending flat springs 16, the upper ends of which are fixed to a pointer 17. The upper end of the pointer 17 is positioned adjacent a scale 18 provided with suitable graduations 19 for a purpose hereinafter described.

At the lower end of the movable element 13 is a laterally extending arm 21 positioned to engage a work engaging plunger 22 which is limited in its movement vertically by a stop 23 and is manually actuated through a lever 24 and a link 25 as hereinafter described.

The movable element 13 carries parallel reeds 26 for supporting a movable member 27, the lower end of which has a laterally extending arm 28 integral therewith and positioned to engage a work engaging plunger 29 which is limited in its vertical movement by a stop 30. Any suitable connection may be made between the gauging plungers 22 and 29 and the link 25, such as pins carried by the gauging plungers and receivable in slots in the ends of the link 25. The inner end of the lever 24 is pivoted to the central portion of the link 25, as at 32, and is pivoted at 33 intermediate its ends to the frame 10 so that downward pressure upon the outer end of the lever 24 will bring about an upward movement of the gauging plungers simultaneously. The gauging plungers 22 and 29 are slidably disposed in apertures in a base 34 and are in general alignment with suitable formed anvils 35 and 36, respectively, for supporting an article being gauged.

At the upper ends of the movable element 13 and the movable member 27 are projections 38 and 39, respectively, which extend toward each other and have secured thereto flat springs 40, the upper ends of which have secured thereto a pointer 41.

A scale 42 is positioned adjacent the pointer 41 and is provided with suitable graduations 43. The scale 42 is mounted upon the upper end of an arm 44 which extends downwardly and is fixed to the movable element 13. The movable element 13 and the movable member 27 are normally urged downwardly by biasing springs 46 and 47, respectively, which also urge their respective work engaging plungers 22 and 29 downwardly into engagement with an article 48 being gauged.

This form of the invention is capable of simultaneously indicating two dimensions of a single article. For example, let it be assumed that the article 48 is an enameled wire and it is desired to determine the diameter of the wire and a thickness of the covering or coating of enamel thereupon. These dimensions may be determined by placing a wire or article 48 upon the anvils 35 and 36 so that a bared portion of the wire rests upon the anvil 35 and a covered or enameled portion rests upon the anvil 36. In conditioning the device for measuring the wire, the lever 24 is first actuated to move the work engaging plungers 22 and 29 away from the anvils so that the wire may be freely placed upon the latter, after which the lever is released allowing the biasing springs 46 and 47 to move the movable element 13 and the movable member 27 downwardly with the work engaging plungers until this movement is stopped by the engagement of the work engaging plungers with their respective portions of the wire. The final positioning of the movable element 13 with respect to the fixed supporting member 11 determines the position of the upper end of the pointer 17 with respect to the scale 18 to indicate the diameter of the bare wire. The pointer 41 is controlled by the movement of the movable member 27 relative to the movable element 13 and as the movable member 27 is moved relative to the movable element 13 an additional distance equal to twice the thickness of the covering upon the wire, the pointer 41 in cooperation with the dial 42 will indicate this measurement. The graduations 43 upon the dial 42 may be arranged to indicate the exact thickness of the covering material or to indicate the difference in diameter between the bare and covered wire.

In Figs. 3 and 4 of the drawing another form of gauge is shown which differs from the form shown in Figs. 1 and 2 only in the support for the article being gauged, and the arrangement of the graduations upon the scales 18 and 42. For this reason like reference numerals are applied to the upper portion of the gauge shown in Fig. 3 and additional description of this portion is not believed necessary. This form of gauge is designed to indicate the diameter or thickness of an article 60 at one end thereof and to indicate the taper of the article simultaneously. An anvil 61 is formed in general contour to support the article 60 so that if the article conforms to the desired dimensions the center line of the article will be in a true horizontal plane and includes a fixed stop 62 to properly position the article on the anvil.

This form of the invention is operated in the same manner as the form shown in Figs. 1 and 2. The lever 24 is pressed downwardly to lift the work engaging plungers 22 and 29 until the article 60 is inserted in place upon the anvil 61, after which the lever is released, allowing the biasing springs 46 and 47 to move the movable element 13 with its plunger 22 downwardly and the movable member 27 with its plunger 29 downwardly until the plungers engage the article. The position of the movable element 13 with respect to the support 11 during the gauging operation determines the position of the pointer 17 with respect to the scale 18, which position will indicate the diameter of the article 60 adjacent the work engaging plunger 22. The position of the movable member 27 with respect to the movable element 13 would determine the position of the pointer 41 with respect to the scale 42, thus indicating the taper of the article 60.

In both forms of the invention the positions of the anvils with respect to their work engaging plungers are determined and adjusted for each type of article to be tested, thus making possible for the apparatus to be conditioned to test articles of different sizes. The scales 18 and 42 may be provided with maximum and minimum indications, or they may be provided with properly arranged scales to accurately indicate the exact measurements of the gauged portions of the article or to accurately indicate the taper of the article as defined in regard to the form shown in Fig. 3.

Although the two forms of the invention shown embody gauge units of the reed type, it should be understood that other types of gauge units may be used and other measuring combinations may be obtained without departing from the spirit and scope of the present invention.

What is claimed is:

1. In a gauge, a frame, means fixed thereto for supporting an article to be gauged, movable work engaging plungers carried by said frame and positioned to engage spaced portions of the article, a gauging unit including a pointer movable in response to the movement of one of said work engaging plungers, a scale fixed to said frame, positioned adjacent said pointer and cooperating therewith to indicate the measurement of one portion of the work, a movable scale carried by said gauging unit, a pointer associated with said movable scale, and means carried by said gauging unit and actuated by the other work engaging plunger for actuating said second mentioned pointer with respect to said movable scale for indicating the measurement of another portion of the work.

2. In an apparatus for gauging simultaneously the cross-sectional dimension of a strand and the thickness of a covering thereon, a frame, means fixed thereto for supporting the strand, movable plungers carried by said frame and positioned to respectively engage a portion of the strand without the covering and a portion with the covering, a movable element actuated by one of said strand engaging plungers, means responsive to the movement of said movable element for indicating the cross-sectional dimension of the strand, a movable member carried by said movable element, movable relative thereto and actuated by the other of said plungers, and means responsive to the movement of said movable member relative to said movable element for indicating the thickness of the covering on the strand.

3. In an apparatus for simultaneously gauging the cross-sectional dimension of an article and the thickness of a covering thereon, a frame, means fixed thereto for supporting the article, article engaging elements movable in the frame and positioned to engage a covered portion of the article and an uncovered portion thereof, respectively, and means responsive to the movement of said engaging elements for simultaneously indicating the thickness of the article and the thickness of the covering thereon.

4. In a gauge, a fixed frame, work supporting elements carried by said frame for supporting work to be gauged, spaced work engaging plungers movably carried by said frame, means for moving said plungers into engagement with spaced portions of the work and means responsive to the movement of said work engaging plungers for simultaneously indicating a dimension of one of said portions of the work being gauged and the difference between said dimension and a dimension of another of said portions of the work.

5. In an apparatus for simultaneously gauging the dimension of one portion of an article and the taper of the article, a frame, means fixed thereto for supporting the article, movable article engaging plungers carried by said frame and positioned to engage spaced portions of the article, means for urging said plungers toward said fixed supporting means and into engagement with said spaced portions, a movable element actuated by one of said article engaging plungers, means responsive to said movable element for indicating the dimension of one portion of the article, a movable member carried by said movable element and actuated by the other of said article engaging plungers, and means responsive to the movement of said movable member relative to said movable element for indicating the taper of the article.

6. In a gauge, a frame, work supporting means fixed thereto, a movable gauging element resiliently secured to said frame, a second movable gauging element resiliently secured to said first movable gauging element, work engaging plungers movable in said frame, positioned to engage said movable gauging elements and movable in response to spaced portions of the work being gauged, means including a pointer operatively connected to said frame and said first movable gauging element and actuated by their relative movement for indicating one dimension of the work, and means including a pointer operatively connected to said movable gauging elements and actuated by their relative movement for indicating another dimension of the work.

7. In a gauge, a frame, work supporting means fixed thereto, a movable gauging element resiliently secured to said frame, a second movable gauging element resiliently secured to said first movable gauging element, work engaging plungers movable in said frame, positioned to engage said movable gauging elements and movable in response to spaced portions of the work being gauged, means including a pointer operatively connected to said frame and said first movable gauging element and actuated by their relative movement for indicating one dimension of the work, and means including a pointer operatively connected to said movable gauging elements and actuated by their relative movement for indicating the difference between said dimension and another dimension of the work.

8. In a gauge, a frame, work supporting means fixed thereto, a movable gauging element carried by said frame, a second movable gauging element carried by said first element and movable relative thereto, work engaging plungers movable in said frame, positioned to engage said movable gauging elements respectively, and movable in response to spaced portions of the work being gauged, means including a pointer resiliently connected to said frame and said first movable gauging element and actuated by their relative movement for indicating one dimension of the work, and means including a pointer resiliently connected to said movable gauging elements and actuated by their relative movement for indicating the difference between said dimension and another dimension of the work.

9. In a gauge, a stationary frame, work supporting means fixed thereto, a movable element resiliently secured to said frame, a second movable element resiliently secured to said first movable gauging element, a scale fixed to said frame, a scale mounted for movement with said first movable gauging element, work engaging plungers movable in said frame, positioned to engage said movable gauging elements and movable in response to spaced portions of the work being gauged, a pointer resiliently connected to said fixed gauging element and said first movable element and actuated by their relative movement for cooperating with said fixed scale for indicating one dimension of the work, and a pointer resiliently connected to said movable gauging elements and actuated by their relative movement for cooperating with said movable scale for indicating another dimension of the work.

10. In a gauge, a frame, means on the frame for supporting an article to be gauged, article engaging elements movable in the frame, means for moving said elements into engagement with different portions of the article, and means responsive to the movements of said elements for simultaneously indicating a dimension of one of said portions and the difference between said dimension and a dimension of another of said portions.

NORBERT K. ENGST.